United States Patent
Lancaster et al.

(10) Patent No.: US 10,520,306 B2
(45) Date of Patent: Dec. 31, 2019

(54) OBSERVATION DEVICE WITH A DISTANCE METER

(71) Applicant: Swarovski-Optik KG., Absam (AT)

(72) Inventors: Gavin Lancaster, Münzkirchen (AT); Konrad A. Roider, Mils (AT)

(73) Assignee: Swarovski-Optik KG. (AT)

(*) Notice: Subject to any disclaimer, the term of this patent is extended or adjusted under 35 U.S.C. 154(b) by 410 days.

(21) Appl. No.: 15/372,868

(22) Filed: Dec. 8, 2016

(65) Prior Publication Data
US 2017/0138728 A1    May 18, 2017

Related U.S. Application Data

(63) Continuation of application No. 13/964,659, filed on Aug. 12, 2013, now Pat. No. 9,593,946, which is a
(Continued)

(30) Foreign Application Priority Data

Jan. 31, 2008  (AT) .................. A 153/2008
Feb. 1, 2008   (AU) .................. A 163/2008
Feb. 2, 2008   (EP) ..................... 08001979

(51) Int. Cl.
*G01C 3/04*   (2006.01)
*B25G 1/00*   (2006.01)
(Continued)

(52) U.S. Cl.
CPC ............... *G01C 3/04* (2013.01); *B25G 1/00* (2013.01); *B25G 1/102* (2013.01); *F41G 3/06* (2013.01);
(Continued)

(58) Field of Classification Search
CPC ......... G02B 23/00; G02B 23/12; G02B 23/18
See application file for complete search history.

(56) References Cited

U.S. PATENT DOCUMENTS 3,622,242 A   11/1971   Land et al.
3,680,946 A    8/1972   Bellows
(Continued)

FOREIGN PATENT DOCUMENTS

DE    6918690 U    12/1969
DE    2502662 A1    8/1975
(Continued)

OTHER PUBLICATIONS

International Search Report, PCT/AT2009/000039, dated Jun. 25, 2009.
(Continued)

*Primary Examiner* — Luke D Ratcliffe
(74) *Attorney, Agent, or Firm* — Lerner, David, Littenberg, Krumholz & Mentlik, LLP

(57) ABSTRACT

The invention relates to a binocular observation device, in particular a field glass, with two visual optical paths and with a laser distance meter with a laser transmitter and a laser receiver and with an opto-electronic display element. A part of an optical path of the laser transmitter is integrated in a first visual optical path and a part of an optical path of the laser receiver is also integrated in the first visual optical path.

14 Claims, 7 Drawing Sheets

Related U.S. Application Data continuation of application No. 12/363,852, filed on Feb. 2, 2009, now Pat. No. 8,525,978.

(60) Provisional application No. 61/137,406, filed on Jul. 30, 2008.

(51) Int. Cl.

| | | |
|---|---|---|
| *B25G 1/10* | (2006.01) | |
| *F41G 3/06* | (2006.01) | |
| *G01S 7/481* | (2006.01) | |
| *G01S 17/02* | (2006.01) | |
| *G01S 17/08* | (2006.01) | |
| *G01S 17/10* | (2006.01) | |
| *G02B 7/06* | (2006.01) | |
| *G02B 7/12* | (2006.01) | |
| *G02B 23/04* | (2006.01) | |
| *G02B 23/10* | (2006.01) | |
| *G02B 23/18* | (2006.01) | |
| *H04W 4/80* | (2018.01) | |
| *F41G 1/38* | (2006.01) | |

(52) U.S. Cl.
CPC .......... *G01S 7/4812* (2013.01); *G01S 17/023* (2013.01); *G01S 17/08* (2013.01); *G01S 17/10* (2013.01); *G02B 7/06* (2013.01); *G02B 7/12* (2013.01); *G02B 23/04* (2013.01); *G02B 23/10* (2013.01); *G02B 23/18* (2013.01); *H04W 4/80* (2018.02); *F41G 1/38* (2013.01); *G01S 7/4817* (2013.01)

(56) References Cited

U.S. PATENT DOCUMENTS

| | | | |
|---|---|---|---|
| 4,262,990 A | 4/1981 | Kamakura | |
| 4,886,347 A | 12/1989 | Monroe | |
| 5,126,549 A | 6/1992 | Yamada | |
| 5,235,458 A | 8/1993 | Akagi et al. | |
| 5,579,165 A | 11/1996 | Michel et al. | |
| 5,610,761 A | 3/1997 | Ishibashi et al. | |
| 5,616,903 A | 4/1997 | Springer | |
| 5,644,425 A | 7/1997 | Palmer | |
| 5,771,407 A | 6/1998 | Imafuji et al. | |
| 5,923,468 A * | 7/1999 | Tsuda | G01C 15/002 250/201.2 |
| 6,142,636 A | 11/2000 | Nemoto et al. | |
| 6,204,961 B1 | 3/2001 | Anderson et al. | |
| 6,233,094 B1 | 5/2001 | Tsuda | |
| 6,266,185 B1 * | 7/2001 | Miller | G02B 7/06 359/407 |
| 6,292,314 B1 | 9/2001 | Perger | |
| 6,307,673 B1 | 10/2001 | Hirunuma et al. | |
| 6,330,056 B1 | 12/2001 | Zadravec | |
| 6,580,495 B2 | 6/2003 | Shirai | |
| 6,753,951 B2 | 6/2004 | Fukumoto | |
| 6,937,391 B2 | 8/2005 | Hirunuma et al. | |
| 7,244,033 B2 | 7/2007 | Yamanouchi | |
| D579,472 S | 10/2008 | Yanagisawa | |
| 7,483,208 B2 | 1/2009 | Zadravec | |
| 7,654,029 B2 | 2/2010 | Peters et al. | |
| 7,738,082 B1 * | 6/2010 | Peters | G01C 3/22 356/4.01 |
| 7,999,924 B2 | 8/2011 | Watanabe | |
| 2001/0028450 A1 | 10/2001 | Zadravec | |
| 2001/0028498 A1 | 10/2001 | Haga et al. | |
| 2002/0071126 A1 | 6/2002 | Shirai et al. | |
| 2003/0002149 A1 | 1/2003 | Watanabe | |
| 2003/0063209 A1 | 4/2003 | Enomoto et al. | |
| 2003/0063380 A1 | 4/2003 | Hirunuma et al. | |
| 2003/0086072 A1 | 5/2003 | Fukumoto et al. | |
| 2003/0151660 A1 | 8/2003 | Hirunuma et al. | |
| 2004/0046953 A1 | 3/2004 | Nagata et al. | |
| 2005/0021282 A1 | 1/2005 | Sammut et al. | |
| 2005/0036129 A1 | 2/2005 | Watanabe | |
| 2006/0193039 A1 | 8/2006 | Yamauchi et al. | |
| 2007/0014003 A1 * | 1/2007 | Zadravec | G02B 23/00 359/399 |
| 2007/0058248 A1 | 3/2007 | Nguyen | |
| 2007/0097351 A1 | 5/2007 | York et al. | |
| 2007/0174152 A1 | 7/2007 | Bjomberg et al. | |
| 2008/0007826 A1 | 1/2008 | Smith et al. | |
| 2009/0141371 A1 | 6/2009 | Brown et al. | |
| 2009/0174939 A1 * | 7/2009 | Heintz | F41G 3/02 359/480 |
| 2009/0201581 A1 | 8/2009 | Gebelein | |

FOREIGN PATENT DOCUMENTS

| | | |
|---|---|---|
| DE | 2714412 A1 | 10/1978 |
| DE | 29518708 U | 1/1996 |
| DE | 19727988 A1 | 1/1998 |
| DE | 19801519 A1 | 7/1998 |
| DE | 19933172 C1 | 1/2001 |
| DE | 10122936 A1 | 11/2001 |
| DE | 10306282 A1 | 8/2003 |
| DE | 102004054182 A1 | 7/2005 |
| DE | 202006017705 U1 | 1/2007 |
| EP | 0636916 A1 | 2/1995 |
| EP | 0932065 A1 | 7/1999 |
| EP | 0961147 A1 | 12/1999 |
| EP | 1069442 A2 | 1/2001 |
| EP | 1298480 A1 | 4/2003 |
| EP | 1744196 A1 | 1/2007 |
| EP | 1783529 A1 | 5/2007 |
| EP | 2078975 A1 | 7/2009 |
| GB | 1477201 A | 6/1977 |
| GB | 1600191 A | 10/1981 |
| JP | 2002098762 A | 4/2002 |
| JP | 2007127690 A | 5/2007 |
| WO | 3802125 A1 | 3/1988 |
| WO | 9711399 A1 | 3/1997 |
| WO | 0171407 A1 | 9/2001 |

OTHER PUBLICATIONS

International Search Report, PCT/AT2009/000037, dated Sep. 30, 2009.

International Search Report, PCT/AT2009/000038, dated Jul. 14, 2009.

Binoculars, Celestron SkyMaster 71009, Mar. 2005.

Experience Your Vision, New: Victory RF Binoculars, leaflet published in the Internet, Jan. 14, 2008.

* cited by examiner

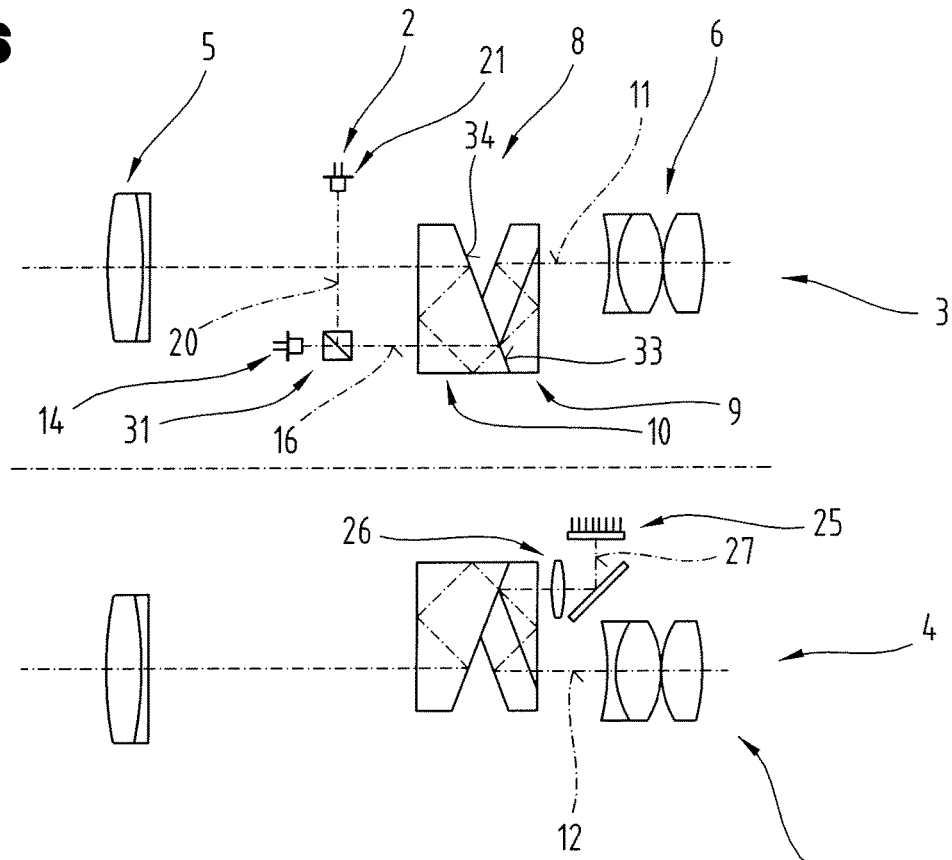
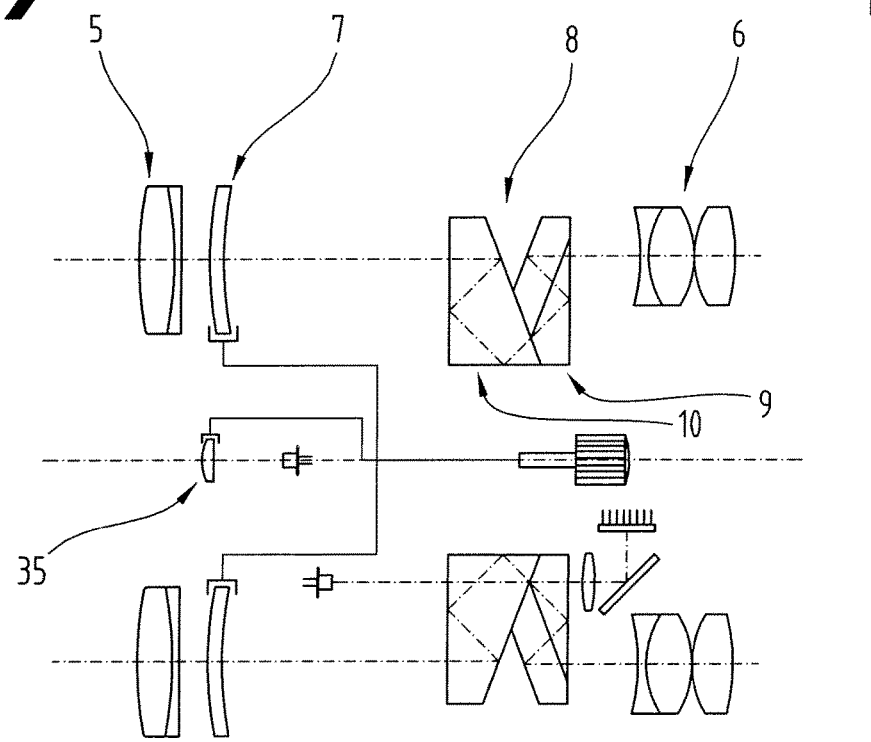

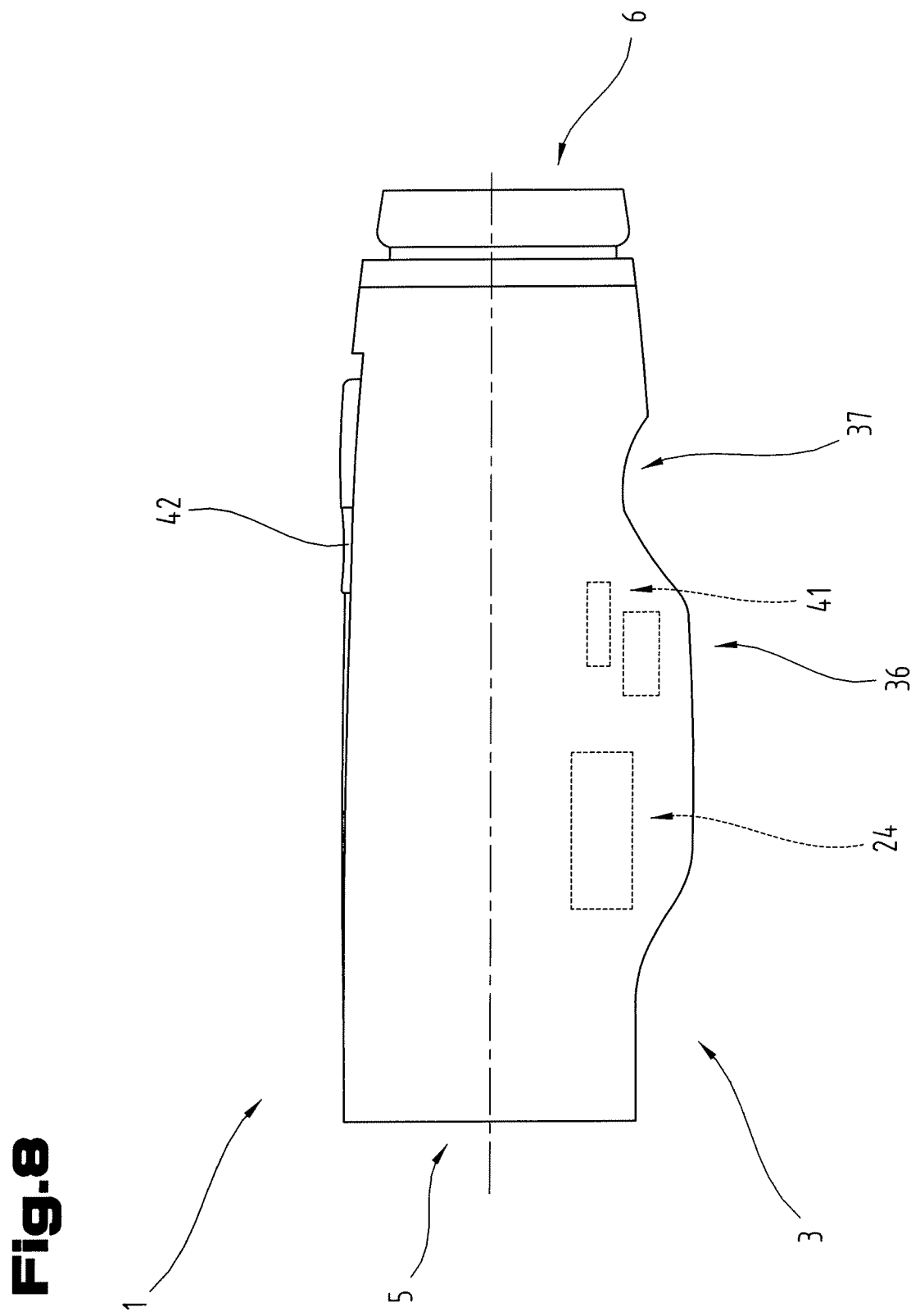

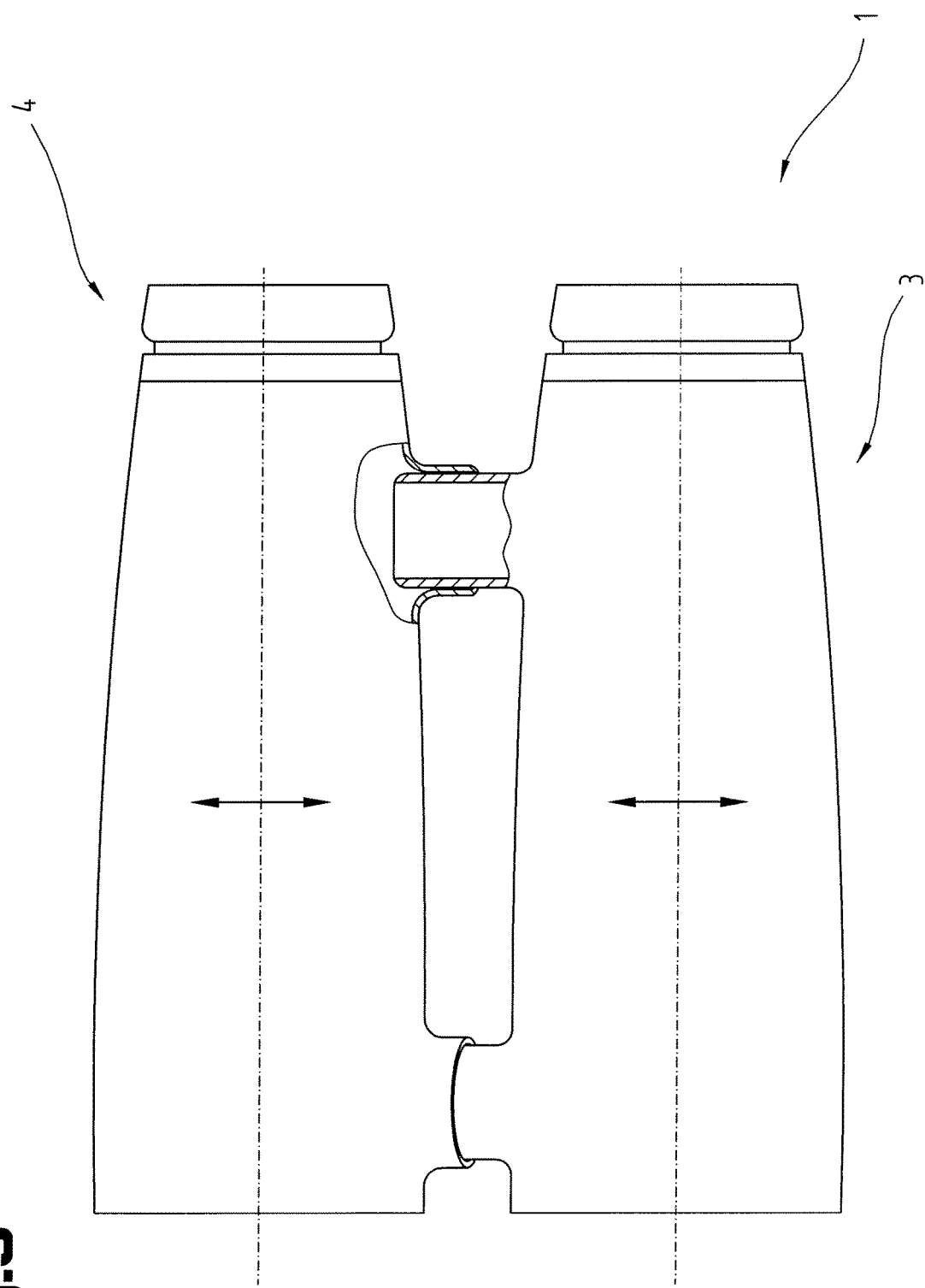

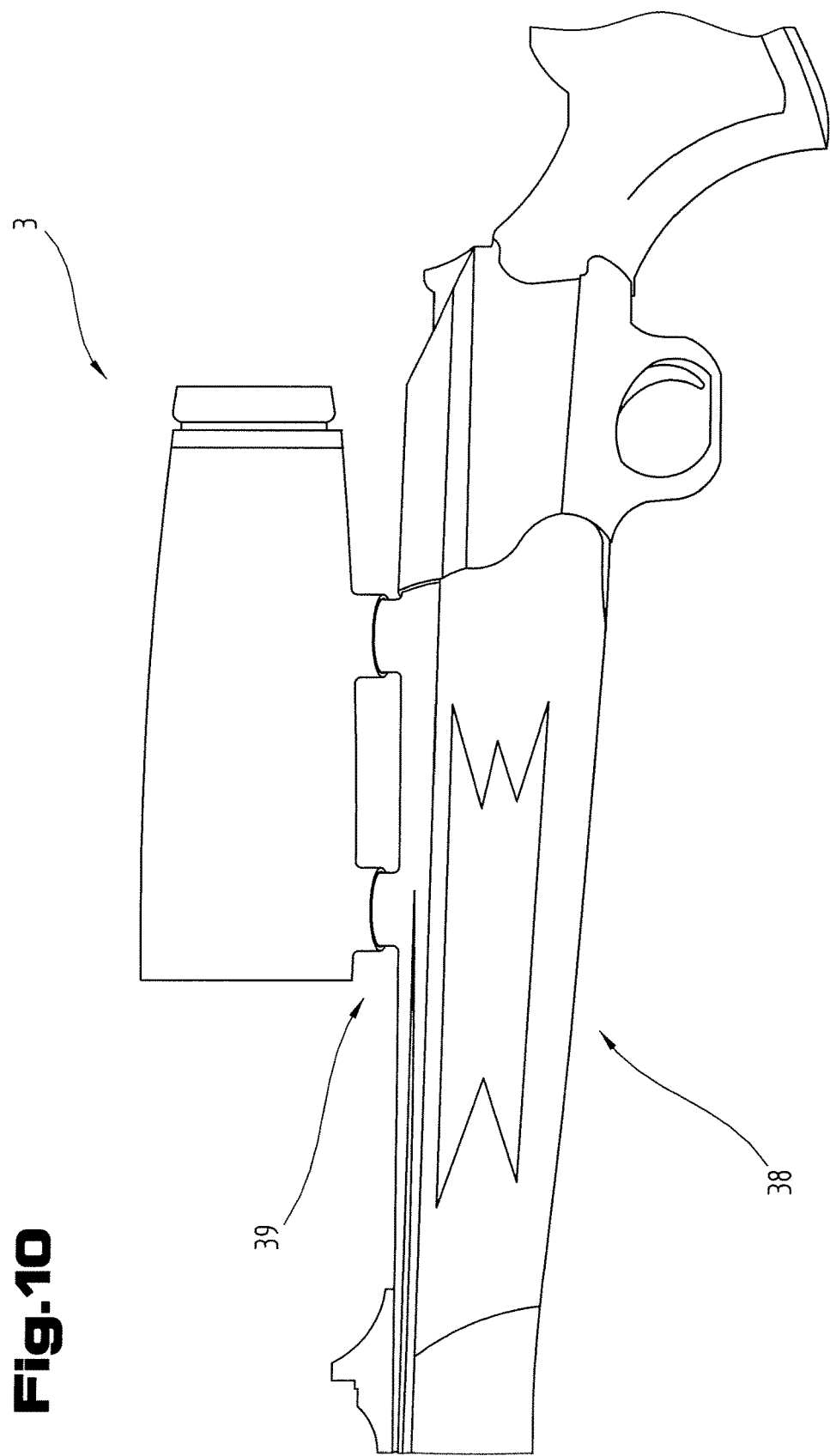

OBSERVATION DEVICE WITH A DISTANCE METER

CROSS-REFERENCE TO RELATED APPLICATIONS

The present application is a continuation, of U.S. patent application Ser. No. 12/363,852, filed on Feb. 2, 2009, which claims the benefit of U.S. Provisional Application No. 61/137,406, filed Jul. 30, 2008, which claims the benefit of Austrian Patent Application No. A 153/2008, filed Jan. 31, 2008; Austrian Patent Application No. A 163/2008, filed Feb. 1, 2008; and European Patent Application No. 08001979.7, filed Feb. 2, 2008; the disclosures of said applications are incorporated by reference herein.

The invention relates to a binocular observation device, in particular a field glass or a magnifier device, with a laser distance meter incorporating the features set out in the introductory parts of claims 1, 5, 7, 8, 10, 11, and 14, and a method for observing and measuring the distance of a remote object.

Binocular field glasses with a laser distance meter are already known, in which a functional element of the laser distance meter is also integrated in one of the two visual optical paths. Document DE 10 2004 054 182 B4 describes a system whereby the lens-side optical path of one of the two observation optical paths of the field glasses simultaneously also constitutes a part of the optical path of the laser receiver, and the laser radiation reflected from the object is deflected to the laser receiver or detector with the aid of an optical splitter. A structurally separate optical path is provided for the laser transmitter, on the other hand, which is disposed in the region of the joint pin of the field glasses and is oriented parallel with the observation axes of the visual optical paths. A collimation lens is provided in front of the laser transmitter at the light outlet end for this purpose. The disadvantage of this system is that when taking distance measurements over a shorter distance, measuring variances can occur due to parallax error.

Patent specification U.S. Pat. No. 6,753,951 B2 discloses a field optical device with a laser distance meter by means of which a remote object can be observed by a visual optical path. In this instance, a laser beam is directed into the visual optical path between the eye of the observer and user of the visual optical path and a focusing device for the visual optical path, and the laser beam reflected by the object is directed via an optical device in front of the user's eye to a laser receiver for evaluation purposes. The disadvantage of this approach is that it is necessary to provide a rotating plate driven by a motor in order to separate the outgoing laser beam and the reflected laser beam.

Other known magnifier devices have separate optical paths both for the visual beam and for the laser beam and the reflected laser beam, which are directed onto the remote object via separate optical devices.

The laser beam is focused both for the outgoing laser beam and for the laser beam reflected by the object via a separate focusing device in each case, and these are drivingly connected to the device operated by the user to focus the visual optical path. Due to the complex design, a large number of mechanical and optical components are needed.

Other magnifier devices are known from DE 197 27 988 A1 as well as DE 69 18 690 U, DE 295 18 708 U1, DE 101 22 936 A1 and DE 27 14 412 A1, which also describe a range of different designs of laser distance meters in conjunction with visual optical paths, but these do not enable an exact measurement result to be obtained due to the complex design of the system used to direct the beam.

The objective of the invention is to improve a binocular observation device or magnifier device with a laser distance meter which will enable greater accuracy and higher reliability to be obtained with respect to the relative orientation of the optical axes of the optical paths of the laser transmitter and laser receiver with respect to one another and to the optical axis of the visual optical paths. Another, preferred, independent objective of the invention is to increase the efficiency of the distance measurement with respect to the laser power needed. Yet another objective of the invention is to propose a method of observing and measuring the distance of a remote object which offers greater user friendliness.

The objective is achieved by the invention on the basis of a device of the type mentioned above whereby the regions of the deflection are located on a single optical component.

The advantage of this approach is that the emitted measuring beam for ascertaining the distance between the observation device and a remote object is oriented exactly on the visual optical path. This reduces the complexity of the optical elements, thereby reducing the weight of the observation devices. The low weight and compact design using few mechanical components results in a small design, especially for binocular observation devices—also referred to as field glasses such as used for hunting, various hobbies, in maritime transport and such like. For viewing purposes, these field glasses are usually held in the user's hand and it is therefore of advantage to make them to a compact design. Furthermore, a low weight permits usage over a significantly longer period but above all permits longer, precise holding without shaking in order to sight the object, and this makes them much better for their intended purpose.

However, the objective is also independently achieved due to the fact that the focusing device for focusing the optical path of the laser transmitter and the visual optical path is disposed between the optical component for deflecting the optical path of the laser transmitter and the lens. The advantage of this solution is that the disposition of the focusing device not only enables the visual optical path to be focused, it also enables the optical path of the laser transmitter to be focused simultaneously without adding to the complexity.

The objective of the invention is achieved by another independent solution due to the fact that a part of an optical path of the laser receiver is also integrated in the first visual optical path. Due to the fact that the returning measuring beam reflected back by the object is screened out of the first visual optical path, there is no reed to provide separate optical elements in the magnifier device, such as a lens for example. This results in a considerable saving on weight and a design with small external dimensions.

Also of advantage is another independent solution whereby a part of an optical path of the laser receiver is also focused using the focusing device fin the visual optical path. This enables the measurement result to be improved because returning measuring beams reflected by the object are also bundled and can be thus directed to the evaluation units or measurement signal receivers.

Another significant saving on weight and above all a simplified design of the optical path can be achieved if, in order to integrate the optical path of the laser transmitter and the optical path of the laser receiver in the first visual optical path, optical components are provided to merge the optical paths of the laser transmitter and laser receiver.

Precision with respect to the laser beam paths of both the emitted and reflected laser beam is obtained if regions of the merger of the optical paths of the laser transmitter and/or laser receiver are located on a single optical component.

In one advantageous embodiment, the regions of the merger of the optical paths of the laser transmitter and/or laser receiver are located on a single surface of the one optical component, for example a roof prism. This means that it is not necessary to provide separate components for the emitted and reflected laser beam.

A particularly advantageous, short design can be achieved for manually operated and used devices, i.e. with regard to the length in the direction of the visual optical paths, if the region of the merger is disposed between an observer-side focal point of the lens and the focusing device or lens.

The volume of such a magnifier device can be reduced, in particular the diameter of the housing or tubes, if at least a part of an optical path of the display optics or the display element is integrated in one of the two visual optical paths.

Another design is of advantage in which a control and evaluation device is connected to at least one display element to display a sight mark and/or a measurement value of the laser distance meter in at least one of the two visual optical paths. This enables a reduction in the components needed for the different displays.

On the basis of another embodiment of the invention, a remote transmission means co-operates with a display element and/or the control and evaluation device, in particular to permit a wireless transmission for a distance measured by the laser distance meter and/or at least one item of data such as a value of the focus setting, a magnification factor, a brightness or temperature value.

This duly enables data to be transmitted to users of similar or identical magnifying devices and enables a simple visual and graphic presentation on co-operating displays and computers for evaluation purposes or for storage. Furthermore, if hunting or observing, a designated target can be easily documented and sighting telescopes adjusted or shooting positions determined on other systems.

A simple way of checking and passing data on to persons other than the user of the magnifier device is possible if another display element is provided on the external face of the observation device.

Data to be stored can advantageously be subjected to further processing due to the fact that the control and evaluation device is wirelessly linked via remote transmission means to an external display that is independent of the observation device.

Exact detection and recognition of the displayed data or information can be achieved if the display element contains opto-electrical components, in particular LED or LCD displays with individual activation of individual pixels for generating images. With this embodiment, it is also possible to display on a display element a whole range of different data signals, characters, sight marks or symbols needed by the user, if desirable one immediately after the other and/or on the basis of a combination.

Even more exact focusing of the visual optical paths on the object can be achieved if a displacement motor is connected to the focusing device. This enables the focusing device to track the actual, automatically determined distance without the user having to undertake a manual adjustment.

In this respect, it is of advantage if the control and evaluation unit is connected to the displacement motor because this enables fully automatic control or tracking of the focusing device to be achieved.

To permit universal use of the magnifier device, especially in the case of field glasses which have two visual optical paths for both eyes of a user extending mutually parallel at a distance, an embodiment has provided to be of practical advantage where the two observation parts are displaceably connected to one another with respect to their relative position via two connecting mechanisms spaced apart from one another in the direction of the optical path, e.g. an articulated bridge or a telescopic guide. This makes it possible to adapt quickly to different eye distances without changes and preferably also without changing the focus setting.

Maintaining the accuracy of the visual observation and the distance measurement is also made easier due to the fact that the two observation parts are mutually connected so that they can be displaced via two connecting mechanisms disposed at a distance apart from one another in the direction of the optical path along the observation direction with two separate joint axes, between which a gap is disposed, which is laterally bounded by the observation parts.

An individual adjustment to the eye position of different people can be undertaken due to the fact that the connecting element is connected to each of the two observation parts at its two end regions facing the two observation parts by means of a joint, the pivot axes of which extend approximately parallel with the longitudinal axes of the two observation parts. Stable and precise connections enable the visual optical paths and the optical paths of the distance measuring device to be kept parallel to a large extent if one or more articulated bridges are provided as the connecting element.

However, another embodiment is of advantage whereby a keel-type housing extension is provided on at least one of the observation parts because this enables electronic components such as power devices and, under certain circumstances, computer devices as well as display elements to be disposed outside of the tubes needed for the visual optical paths.

The fact that the housing extension has an inner housing region for device electronics, in particular for the control and evaluation unit, results in a high degree of multi-functionality and the resultant embodiment lends itself to a plurality of variants which can be specifically adapted to different applications.

In the case of another embodiment proposed by the invention, one observation part is provided as an independent magnifier device. This is of advantage because parts of a magnifier device, in particular a field glass with two observation parts, can be made as individual parts for separate applications, for example for use with weapons.

Also of advantage is another embodiment in which the optical component or components for deflecting the optical path of the laser transmitter and/or of the laser receiver are formed by elements of a reversing system. This enables multiple use of the optical element for different beam guides of the optical path and also the measuring beam paths, thereby significantly simplifying the optical system, in addition to which the number of optical elements needed is reduced. Nevertheless, in spite of the reduced number of optical elements, it is still possible to obtain an optical device offering the same high precision for a low weight.

A compact construction can be achieved due to the fact that the regions of the deflections disposed in one and the same roof prism are provided with optical components, and it is of advantage if the reversing system is a prism system.

The objective of the invention can also be achieved independently on the basis of an embodiment of a binocular observation device of the type outlined above if the third optical path incorporates a focusing device which is coupled so as to co-operate with a focusing device of the two visual optical paths in order to focus on a remote object. A device based on this design can be used both in the short and the long range.

Since the optics for the outgoing and reflected laser beam need to be of a special design hut the visual optical paths can be used for one of the two beams, namely either the outgoing laser beam or the reflected laser beam, a good compromise can be obtained between optical adaptation, weight and a simple design.

An extremely advantageous compact design can be achieved if the third optical path is provided with a transmitter focusing device, which is coupled with a focusing device of the two visual optical paths for focusing the optical paths and laser transmitter simultaneously, and a part of an optical path of the laser transmitter or of the laser receiver is integrated in one of the visual optical paths.

The objective of the invention is also individually achieved by means of a magnifier device where the regions of the deflection are located on a single optical component. This results in a design of a very low weight requiring few optical components in the smallest space.

The objective is also achieved by the invention on the basis of a method of observing and measuring the distance of an object. This method is characterized by the fact that the object is sighted by means of the visual optical path and the measuring operation is initiated by laser pulse emitted by the laser transmitter, and a time delay is determined, after which a value for the distance to the remote object is calculated and displayed by a control and evaluation device, and a focus setting is set by adjusting a focusing device on the basis of the value for the distance.

Based on another combination of features enabling the objective to be achieved independently, the object is sighted by means of the visual optical paths, and the measuring operation is initiated buy a laser pulse emitted by the laser transmitter across the laser beam path at least partially integrated in the visual optical path, and a time delay is determined, after which a value for the distance to the remote object is calculated and displayed by a control and evaluation device, and the two visual optical paths and laser beam path are focused on the basis of the value for the distance by an adjustment made by the focusing device. The advantage of this method is that the focusing device determines the exact distance on the basis of the measured distance, for example on the basis of a rough preliminary adjustment, after which the visual optical paths and for example the laser beam path of the emitted or reflected laser radiation can be focused. This significantly increases the accuracy and speed of the focusing operation such as needed when hunting, especially if it is necessary to observe moving objects. A constantly sharp image of the object can therefore be guaranteed, even whilst it is moving.

Other advantageous features enable the focus to be set semi-automatically or automatically or on the basis of a rough manual adjustment, and the display takes place after a rough manual adjustment to enable precise focusing, even in poor viewing conditions.

It is also of advantage if the method steps involved in initiating a measuring operation, calculating a value for the distance of the remote object and focusing the focusing device on the basis thereof are run repeatedly one after the other. This ensures continuous focusing even if the sighted object is moving.

To this end, it is also of advantage if the method steps for observing a moved object are continuously repeated.

The measurement results can be optimized due to the fact that the laser power of the laser transmitters is adapted and/or optimized via the control and evaluation device as a function of the measured distance between the laser transmitter and object.

To provide a clearer understanding, the invention will be explained in more detail below with reference to the drawings.

These provide schematically simplified diagrams as follows:

FIG. 6 illustrates example of another embodiment of a binocular observation device;

FIG. 7 illustrates an example of another embodiment of an observation device with a third optical path;

FIG. 8 is a side view of observation device illustrated in FIG. 1;

FIG. 9 shows an observation device 1 with an alternative embodiment of the eye width adjustment;

FIG. 10 shows an example of another embodiment of an observation device illustrated in FIG. 9 based on a modular design.

Figure 1:
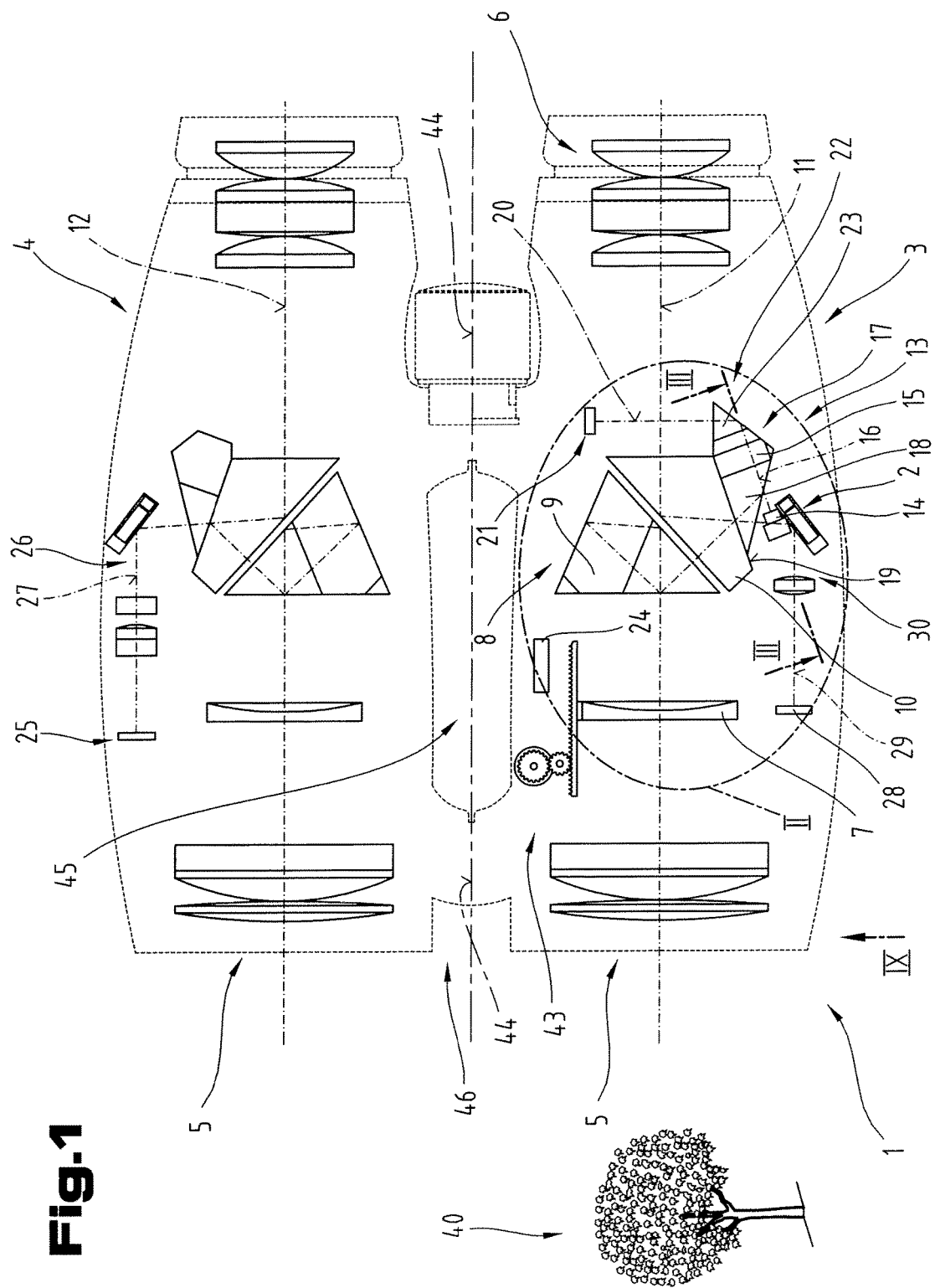
FIG. 1 is an optical diagram of a field glass with an integrated distance meter.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIG. 1 is an optical diagram of an observation device 1, in particular a field glass with an integrated laser distance meter 7.

The observation device 1 comprises a first observation part 3 and a second observation part 4, each of which constitutes a magnifier device. In terms of their optical components, the two observation parts 3, 4 are of an identical design and comprise firstly a lens 5 and an ocular 6 for magnifying an observed object. On the basis of the embodiment illustrated as an example, focusing takes place by means of a focusing device 7, which is preferably provided in the form of a lens. In order to set up and present the observed object on the correct side, a reversing system 8 is disposed between the focusing device 7 and the ocular 6. In the embodiment illustrated as an example here, the reversing system 8 is provided in the form of a prism system comprising a roof prism 9 and a deviation prism 10.

Said optical components therefore define a first visual optical path 11 of the first observation part 3 and a second visual optical path 12 of the second observation part 4. To preserve clarity, the optical paths 11 and 12 are illustrated on a simplified basis and are symbolized by the corresponding main beams or the corresponding optical axes of the observation parts 3 and 4.

In principle, it should be pointed out in this respect that throughout the entire description, where mention is made of optical paths, this should be understood as meaning a bundle of beams, in other words a so-called homocentric beam bundle.

In order to take the distance measurement, the first observation part 3 also has a transmitting optical system 13 with a laser transmitter 14 and transmitter optics 15. The laser transmitter 14 is integrated in the first observation part 3 so that a part of an optical path 16 of the laser transmitter 14 is deflected into the first visual optical path 11. In order to deflect the optical path 16 of the laser transmitter 14, optical components are provided in the first observation part 3, which in the embodiment are a deviation prism 17 and a splitter prism 18. To this end, the splitter prism 18 is disposed on the face 19 of the deviation prism 10 lying opposite the roof prism 9 or on the face 19 of the roof prism 10 connected to it. The face 19 constitutes a beam splitter because it is provided with a partially permeable coating. As a result of this coating of the face 19, the visual optical path 11 is reflected on it, whereas the light of the laser transmitter 14 is not reflected and passes through the face 19 unobstructed. The point where the optical path 16 of the laser transmitters 14 merges with the first visual optical path 11 is therefore disposed on the face 19 of the deviation prism 10 and splitter prism 18. To this end, the direction of the optical path 16 of the laser transmitter and the direction of the first visual optical path 11 following its lens-side course are identically directed in the region and interior of the deviation prism 10. Since the optical path 16 of the laser transmitter 14 also passes through the focusing device 7 and lens 5 on its way to the object, the laser transmitter 14 and the optical path 16 of the laser transmitter can be focused on the object and in the object plane.

Different embodiments may be used for the beam splitter disposed in the face 19. If using a coating that is partially transparent as a function of wavelength, it must be adapted to the wavelength of the laser light of the laser transmitter 14 used. The coating has a transmission characteristic based on wavelength, which exhibits a very high value of the transmission coefficient in only a very narrow wavelength range, and this very narrow wavelength range corresponds to the wavelength of the laser radiation of the laser transmitter 14 used. The laser radiation used may be both in the visible wavelength range and in a non-visible wavelength range. However, it is preferable to use a laser transmitter 14 which transmits in the infrared range because this avoids any detrimental effect on visual observation. For example, adaptation of the observer's eye could be detrimentally affected by scattered light from the laser transmitter 14 at dusk. To cause a split in the beam, the polarization of the laser light could be used as an alternative. Another alternative option for a beam splitter is that of a spatial division, in which case a metallic mirror is used for only a part-region of the spatial angle of an optical path or a beam bundle, as will be explained later on in the description with reference to FIG. 3.

Once the laser light has been reflected on a remote object, reflected laser beams pass jointly through the first visual optical path 11 back into the observation device 1. Due to the partially transparent coating of the face 19 between the deviation prism 10 and the splitter prism 18, an optical path 20 of the laser receiver is split from the first visual optical path 11 at this face 19. In order to detect or measure the reflected laser radiation, a receiver 21 is provided and to this end, the laser light is directed through a receiving optical system 22 which in this embodiment comprises the splitter prism 18 and a receiver prism 23. Since the first visual optical path 11 and the optical path 20 of the laser receiver are merged and split at the face 19 between the deviation prism 10 and splitter prism 18, a part of the optical path 20 of the laser receiver is also integrated in the first visual optical path 11. In this observation device 1 with a laser distance meter 2, therefore, optical components are provided as a means of integrating the optical path 16 of the laser transmitter 14 and the optical path 20 of the laser receiver 21 in the first visual optical path 11, in which a merger takes place between the first visual optical path 11 and the optical path 16 of the laser transmitters 14 or the optical path 20 of the laser receiver 21. Based on the embodiment described as an example here, the region of the merger is located on a single optical component, namely the face 19 of the deviation prism 10. The introduction of the laser radiation of the laser transmitter 14 as well as splitting of the reflected laser radiation from the first visual optical path 11 therefore take place on the single face 19.

As proposed by the invention, therefore, the region of the merger, i.e. the joining or splitting of the optical paths 16, 20 of the laser transmitter 14 or laser receiver 21 on the one hand and of the visual beam path 11 on the other hand, is disposed between the observer-side focal point of the lens 5 and the focusing device 7 or lens 5. In order to project between the remote object on the one hand and the image of the object generated on the observer side on the other hand, and in order to project the laser transmitter 14 and laser receiver 21 onto the remote object, the same disposition of the optical components of the lens 5 and the focusing device 7 is decisive. The particular advantage of this spatial disposition of said optical components with respect to one another is that only one change to the setting of a single optical component is needed, namely the focusing device 7, to enable both the first visual optical path 11 to be focused and the optical path 16 of the laser transmitter 14 and the beam path 20 of the laser receiver 21. As a result, the radiation reflected back from the remote object can be used for the distance measurement for every distance setting resulting in a high degree of efficiency.

The distance is measured in a manner known per se, based on the principle of measuring the time delay of a laser pulse or a sequence of laser pulses emitted by the laser transmitter 14 and reflected back from an object. The distance of the sighted object is then calculated from the ratio of the time difference between emission of a laser pulse and reception of the reflected laser light by reference to the speed of light. The instant at which the reflected laser signal is received is detected by the receiver 21. A control and evaluation unit 24 is provided as a means of computing and controlling the functions of the observation device 1. The values for the distance finally calculated in the control unit 24 can be presented for the observer in the visual field because a display element 25 with co-operating display optics 26 is provided in one of the two observation parts 3, 4. The display optics 26 in this example of an embodiment are disposed in the second observation part 4 so that the optical path 27 of the display optics 26 is integrated in the ocular-end part of the second visual optical path 12. The region of the merger of the optical path 27 of the display optics 26 into the second visual optical path 12 is located on a partially reflecting surface of a prism as described above in connection with the reversing system 8 of the first observation part 3.

Naturally, it would also be possible to display the calculated values for the distance or sight mark 28 in both or optionally in only one of the two observation parts 3, 4. In addition, it is also advantageously possible to provide a display on the outside of the observation device 1, on which the measured distance can be continuously or intermittently displayed and prompted by the user.

Another option is to set up a transmission via remote transmission means 41, in particular via wireless remote transmission means 41, for example by radio or infrared, to transmit the measured distance and other data, such as the selected focus setting and/or a magnification factor and/or brightness or temperature values, to different parts of the observation device 1 or separate display and/or evaluation devices. However, it is also of practical advantage to store these in the observation device 1 or store and link them to one another for different evaluations, and present them when prompted on a display device 42 mounted on the external face of the observation device 1, for example.

Another option is to transmit this data via these transmission means to an external display element, which may advantageously be provided independently of the observation device 1. Above all, it is of practical advantage to transmit this data to a sighting telescope of a weapon or other systems for monitoring and controlling devices which require such data pertaining to distance.

In order to make it easier to sight an object to be observed and to which the distance has to be measured, a sight mark 28 is also provided in the first observation part 3. The sight mark 28 or an optical path 29 of the sight mark 28 is transferred via sight mark optics 30 in the ocular-end part of the first visual optical path 11 provided for this purpose. The region of the merger of the optical path 29 of the sight mark 28 is therefore also disposed on the face 19 lying between the deviation prism 10 and splitter prism 18.

On the basis of an alternative embodiment, it is also possible to integrate the optical path 27 of the display element 25 in the first observation part 3 of the observation device in addition to the optical path 29 of the sight mark 28. In this respect, it would also be of advantage to use the display element 25 itself to generate the sight mark 28. An opto-electronic display element is preferably used for the display element 25, which enables individual activation of pixels generating an individual image. This offers a simple way of calibrating the sight mark 28. Using the opto-electronic display element 25 also means that the shape of the sight mark 28 can be freely selected. For example, the observer could be provided with a display via an appropriate input device and the device electronics cause a desired sight mark 28 to be selected from a co-operating memory using software. Using the display element 25 to generate the sight mark 28 has a particular advantage in that it reduces the number of components needed to produce the observation device 1.

The sight mark 28 can be produced via an optical element and a light source, for example an appropriately designed screen, and placed in the visual optical path of the observation parts 3, 4. The display device and the device for displaying the sight mark may be provided in the form of appropriate opto-electronic components, in particular LED, LCD displays or similar.

In another embodiment, the laser transmitter 14 and the receiver 21 with their optical paths 16, 20 are disposed in the first observation part 3, whereas the display element 25 and the sight mark 28 with their optical paths 27, 29 are integrated in the second observation part 4. As explained above, the display element 25 and sight mark 28 may be provided as a common display element 25.

Figure 2:
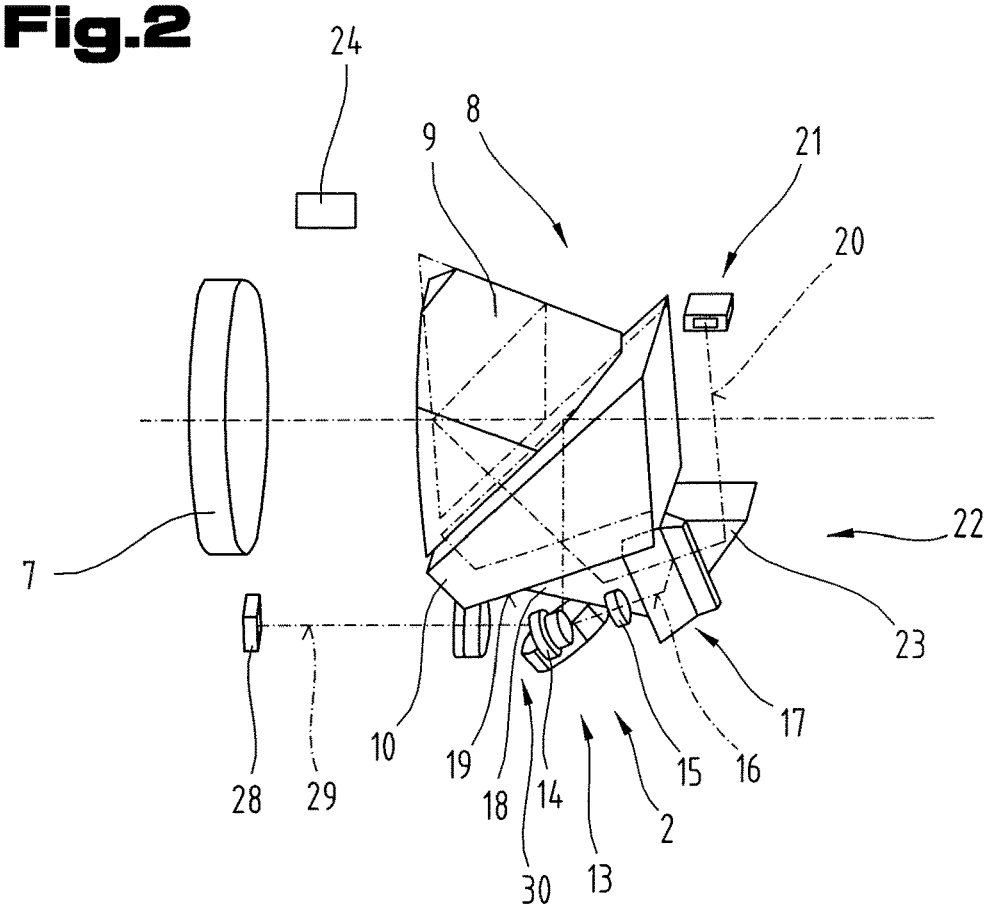
FIG. 2 shows a detail of the first observation part illustrated in FIG. 1 on a larger scale.

FIG. 2 is a perspective view on a larger scale showing a detail of the first observation part 3 illustrated in FIG. 1. Starting from the laser transmitter 14, the laser light is directed via the optical path 16 of the laser transmitter 14 through the transmitting optics 15, the deviation prism 17 and splitter prism 18 on the face 19 into the lens-side part of the first visual optical path 11. Towards the receiver 21, the reflected laser beams on the face 19 are directed out of the deviation prism 10 of the reversing system 8 and pass through the splitter prism 18 into the receiver prism 23, where they are finally deflected to the receiver 21. The optical path 29 of the sight mark 28 leads from the sight mark 28 via the sight mark optics 30 through the splitter prism 18 into the deviation prism 10 in such a way or in such an orientation that the optical path 29 of the sight mark 28 is transferred to the ocular-side part of the first visual optical path 11.

Figure 3:
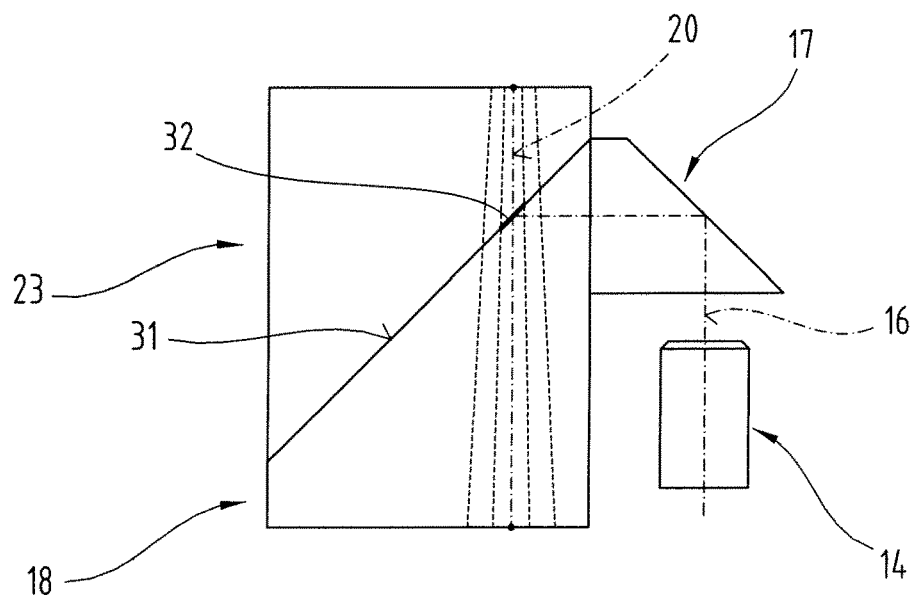
FIG. 3 is a section throng transmitter optical system and the receiver optical system based on FIG. 1.

A beam splitter 31 is disposed between the splitter prism 18 and the receiver prism 23, which causes a split between the optical path 16 of the laser transmitter 14 and the optical path 20 of the laser receiver 21, as illustrated more clearly in FIG. 3.

FIG. 3 shows a section through the transmitting optical system 13 and receiving optical system 22 illustrated in FIG. 1. It illustrates the different paths of the optical path 16 of the laser transmitter 14 and the optical path 20 of the laser receiver 21 split at the beam splitter 31. In the ease of this example of an embodiment, the beam splitter 31 is provided in the form of a mirror 32 disposed in a boundary region between the splitter prism 18 and receiver prism 23. The mirror 32 extends across only a part-region of the surface of the optical path 20 of the laser receiver 21 passing through the beam splitter 31 or through the boundary surface between the splitter prism 18 and receiver prism 23. A split therefore takes place at the splitter 31 between the two optical paths 16 and 20 in accordance with the different spatial angular regions of the beam bundle passing along the optical paths 16 and 20 and the beam splitter 31. In a preferred embodiment, the mirror 32 is provided in the form of an elliptical surface. The laser light emitted by the laser transmitter 14 has a small opening angle relative to the laser light beam bundle reflected by the object. Accordingly, only slight shadowing of the laser light reflected by the remote object takes place at the mirror 32.

As proposed by the invention, the receiver prism 23 and the deviation prism 17 are secured to the splitter prism 18, for example by means of cement. The splitter prism 18, on the other hand, is fixedly connected to the deviation prism 10 of the reversing system 8 of the visual optical path 11. The splitter prism 18, deviation prism 17, receiver prism 23 and deviation prism 10 therefore constitute a monolithically fixedly connected unit. The advantage of this is that a correspondingly smaller number of retaining means are needed to fit the prism system in the observation part 3. The effort involved in adjusting the spatial position of the co-operating prisms with respect to one another is also significantly reduced. This being the case, functional errors due to faulty adjustment are also much less likely.

Figure 4:
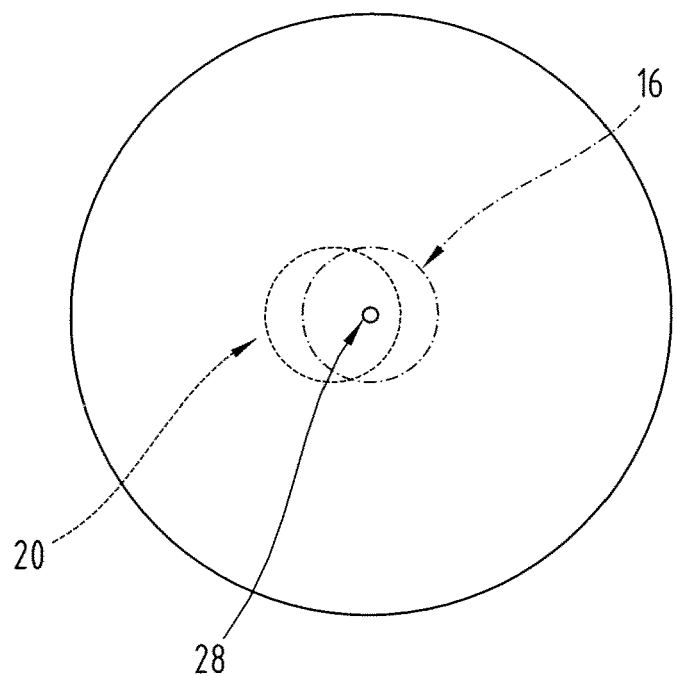
FIG. 4 shows an image of the visual field which can be observed through the ocular.

FIG. 4 illustrates an image of the visual field which can be observed through the ocular 6 with the image of the sight mark 28. The region of the optical path 16 of the laser transmitter 14 is indicated by broken lines. The optical path 20 of the receiver 21 is also indicated by broken lines. The diagram illustrated in FIG. 4 on the one hand corresponds to the region in the object plane which is illuminated by the laser transmitter 14 or the optical path 16 of the laser transmitter 14 on the object. This is simultaneously an image of the laser transmitter 14 focused in the object plane. On the other hand, the region indicated by broken lines corresponds to the optical path 20 of the receiver 21 in an image of the receiver 21 focused in the object plane. Accordingly, only the part of the optical path 20 of the receiver disposed in the intersecting region is available to the receiver 21 for detecting reflected laser light. By adjusting the receiving optical system 22 accordingly, the regions of the optical path 20 of the receiver 21 indicated in FIG. 4 can be centrally oriented with the region of the optical path 16 of the laser transmitter 14. By preference, these two regions are moved so that they overlap so that the maximum of the reflected laser radiation hits the receiver 21. In this respect, it should also be pointed out that the indicated regions 16, 20 are generally not visible to the human eye because the laser light used is selected so that it is in a frequency range which lies outside the visible range. This being the case, infrared laser diodes are used for the laser transmitter 14, for example.

In one embodiment in which the optical path 16 of the laser transmitter 14 is disposed in one of the two visual optical paths 11 or 12 in one of the observation parts 3, 4 and the optical path 20 of the receiver 21 is disposed in the other of the two visual optical paths 12 or 11, an adjusting mechanism is provided, by means of which the course of the optical paths 16 and 20 can be shifted to the degree that they overlap to the highest possible extent on the remote object. As a result, even in the case of an observation device 1 of the type illustrated in FIG. 1 where the two observation parts 3, 4 can be pivoted relative to one another about a central joint axis, a perfect distance measurement can be guaranteed. Alternatively, however, it is also possible for the optical path 20 of the receiver 21 to have a bigger opening angle than the optical path 16 of the laser transmitter 14 so that a biggest possible proportion of the radiation emitted by the laser transmitter 14 is detected by the receiver 21, even if there are variances in the spatial position of the two visual optical paths 11 or 12 in the event of different adjustments of the eye distance. By increasing the opening angle of the optical path 20 of the receiver 21 accordingly, allowance can also be made for a relative movement of the optical paths 16, 20 caused by a spatial displacement of the two observation parts 3, 4 relative to one another about a central link axis in order to adjust the eye distance, so that as big as possible a proportion of the radiation emitted by the laser transmitter 14 is still detected by the receiver. Such variances might be caused by a non-parallel orientation of the two visual optical paths 11, 12 relative to the orientation of the joint axis.

The advantage of the embodiment in which the laser transmitter 14 with its optical path 16 is disposed in one of the two observation parts 3, 4 and the receiver 21 with its optical path 20 is disposed in the other observation part 4, 3 is that the entire region or opening angle of the two visual optical paths 11, 12 is available without obstruction for use of the laser energy to measure the distance, thereby resulting in a high efficiency of the laser distance measurement. In the case of the embodiment described above, the display element 25 and/or the sight mark 28 may be disposed in one of the two observation parts 3, 4 or alternatively may be separated and disposed one each in one of the observation parts 3 or 4 or also in both observation parts 3, 4, and preferably can be activated individually.

In view of the fact that safety regulations governing visual observation devices 1 permit only a limited maximum value for the radiation power which may come into contact with the human eye during observation, the laser power used with the observation device 1 proposed by the invention is also adapted or optimized depending on the measured distance of the observed object. This is possible because the image of the laser transmitter 14 is also focused on the remote object.

On the basis of a preferred method of observing and measuring the distance of a remote object, the observation device 1 is firstly pointed towards the object so that it sights it. Sighting of the object is assisted by projecting in the sight mark 28. The sight mark 28 can be projected in by operating a switch, for example, and is preferably automatically switched off once the measuring operation carried out by the control and evaluation unit 24 starts. The preferably manually initiated measuring operation takes place whilst the observation device 1 is held sighted on the object. On the basis of the time delay measurements of the laser pulses taken during the measuring operation, the control and evaluation unit 24 then calculates a value for the distance of the remote object, which is then displayed with the aid of the display element 25 in the visual field of the second observation part 4.

In the case of another variant of the method, the initially calculated value is used as a basis for a focus setting by adjusting the focusing device 7. This adjustment preferably takes place automatically, in which case a displacement motor used to displace the focusing lens used as the focusing device 24 is operated by the control and evaluation unit 24.

Alternatively, the focus setting of the visual optical path 11, 12 may also be carried out semi-automatically. The focus setting can also be speeded up by applying a rough setting first of all. To this end, it may be that a sensor determines the current value of the setting of the focusing device 7 and displays this value corresponding to the distance value together with the value for the distance determined by the laser distance measurement on the display element 25. The user of the observation device 1 therefore has the option of varying the visual optical paths 11, 12 by adjusting the focusing device 7 until the distance value corresponding to the focusing device 7 is the same as the value measured by the laser distance meter and displayed.

In order to adjust the focusing device 7 semi-automatically, both with respect to the visual optical path and the optical path of the measurement signal and reflected measurement signal or optical path 16 of the transmitter 14 or optical path 20 of the receiver 21, the adjustment direction of the operating device for adjusting the focusing device 7 can be displayed by means of a separate display device which is also provided by the display device 25 for the distance meter, for example by means of arrows which may also of a different length depending on the size of the adjustment. Instead of arrows, it would naturally also be possible to use other graphic symbols or optical or acoustic signals.

In another embodiment of the method for observing and measuring the distance the method steps of initiating a measuring operation, calculating a value for the distance of the remote object and setting the focus of the focusing device 7 on the basis of it may be run one after the other repeatedly rather than just once. This will result in greater accuracy of the value for the distance and better focusing. By continuously repeating these measuring, evaluation and focusing steps, it is also possible for an object moving away or moving closer to be automatically focused, making the focus setting very convenient for the observer. The advantage of both of the methods proposed by the invention, namely both semi-automatic and automatic focusing, is that even at dusk or more generally in unfavorable light conditions, a convenient and reliable focus setting can take place. The observation device 1 proposed by the invention and the described methods based on automatic and semi-automatic focusing therefore offer particular advantages over conventional automatic focusing systems. These advantages apply to both the binocular observation device proposed by the invention and also to a magnifier device comprising only one observation part 3, 4, e.g. terrestrial telescopes of sighting telescopes.

Figure 5:
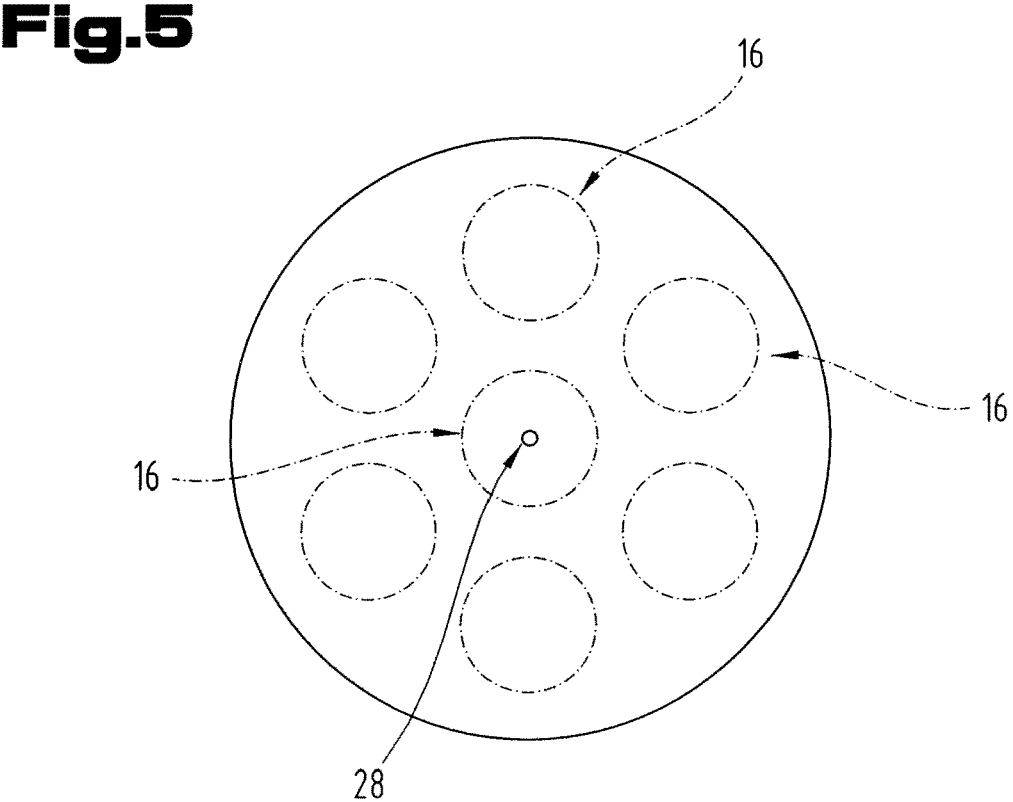
FIG. 5 shows an image of the visual field which can be observed through the ocular with several measurement ranges.

FIG. 5 shows a diagram of a laser distance meter 2 with several measurement ranges or optical paths 16 of the laser transmitter 14. In a corresponding embodiment of the laser distance meter, several laser transmitters 14 may be provided, for example. Depending on their relative disposition with respect to one another, several receiving regions or several receivers 21 may be provided in the place where the laser receiver 21 is mounted. Based on such an arrangement with several optical paths 16 of the laser transmitter 14, it is possible, in addition to the distance of a central object, to measure simultaneously also the values of distances of other objects in the target area disposed next to the central object and show these on a display. With an observation device 1 positioned in a fixed direction, it is therefore also possible to run a method of measuring the movement or speed of an object moving in the target area. If an object in the target area moves across two or more of the regions of optical paths 16 indicated in FIG. 5, this will be linked to sudden changes in the respective values for the distance recorded by the control unit 24. On the basis of the recorded distance values and also the time sequence of the sudden changes in the distance values, conclusions can be drawn about the movement and about the speed of movement of an object in the target area using the respective angular distances of the measurement ranges.

On the basis of an alternative embodiment corresponding to the observation device 1 illustrated in FIG. 5 with several optical paths 16 of the laser transmitter, several laser transmitters 14 are not provided and instead, the image of the one laser transmitter 14 is deflected into different spatial angular regions in a time sequence with the aid of a co-operating optical component. This being the ease, the several observation ranges indicated in FIG. 5 are scanned consecutively in time.

On the basis of another embodiment of the method for observing and measuring a distance, an optical component is provided in the laser transmitter 14 in order to continuously change the direction of the optical path 16 of the laser transmitter 14. This enables continuous linear scanning of the spatial angular region of the visual field of the observation device 1.

FIG. 6 illustrates another example of an embodiment of a binocular observation device 1 with a magnifier device comprising the lens 5 and ocular 6. The optical path 11, which is illustrated in a simplified manner by only its main beam, is deflected in terms of its course by means of a reversing system 8, as was the case with the embodiment described in connection with FIG. 1, but the design of the reversing systems 8 corresponds to a different type of prism system from that illustrated in FIG. 1. Starting from the lens 5, the sequence is namely, firstly the deviation prism 10 followed by the roof prism 9, and the two prisms 9, 10 are disposed on a gable surface 33 of the roof prism 9 and are cemented to one another or lie adjoining one another. The gable surface 33 lying against the deviation prism 10 is provided with a beam-splitting coating. It preferably transmits for the spectral of the observation beams and reflects for the spectral range of the light used by the display element 25. Accordingly, the optical path 16 of the laser transmitter 14, having passed through the beam splitter 31 and having been reflected on the beam-splitting coating 33 and having been reflected 3 times in the deviation prism 17, extends parallel with the first visual optical path 11. Laser light reflected from a remote object follows the reverse path and after being reflected on the beam-splitting coating in the gable surface 33 is deflected by the beam splitter 31 onto the receiver 21. In the case of the observation device 1 based on this embodiment, therefore, both a part of the optical path 16 of the laser transmitter 14 and a part of the optical path 20 of the receiver 21 are integrated in the first visual optical path 11. The merger of the optical path 16 and the beam path 20 of the laser transmitter 14 and receiver 21 in the first visual optical path 11 is disposed on the gable surface 33.

In the embodiment illustrated as an example, the display element 25 is projected into the ocular-end part of the second visual optical path 12 in the second observation part 4, whereas the optical paths 16, 20 are integrated in the first observation part 3. Alternatively, however, it is also possible to integrate the optical path 27 of the display element 25 in the first observation part 3.

In an alternative embodiment of the observation device 1 illustrated in FIG. 6, the region of the merger could also be disposed between the optical paths 16, 20 and the first visual optical path. 11, in other words in the face 34 of the deviation prism 10 adjoining the gable surface 33. To this end, the face 34 is provided with a beam-splitting coating.

FIG. 7 illustrates an observation device 1 with a laser distance meter 2, in which an arrangement separate from the visual optical paths 11, 12 is provided for the optical path 16 of the laser transmitter 14 so that a third optical path is provided.

In order to set the focus, a focusing device 7 in the form of a focusing lens is provided respectively in the first and second visual optical path 11, 12. Disposed in the optical path 16 of the laser transmitter 14, before the laser transmitter 14 at the object end, is a transmitter focusing device 35. By adjusting the transmitter focusing device 35, the focus can be set for the image of the laser transmitter 14 in the object plane of a remote object. As proposed by the invention, the transmitter focusing device 35 in this observation device 1 is coupled with the focusing device 7 of the two visual optical paths 11, 12 so that at the same time as the images of the visual optical paths 11, 12 are focused, the image of the laser transmitter 14 can also be focused.

A method corresponding to one of the methods described above for observing and measuring a distance can be used with observation devices 1 based on the examples of embodiments illustrated in FIGS. 6 and 7, thereby enabling automatic or semi-automatic focusing in particular.

FIG. 8 shows a side view of the observation device 1 illustrated in FIG. 1. As illustrated, the observation parts 3, 4 have an approximately tubular main shape. In a bottom region of the observation part 3, 4, it has a keel-shaped housing extension 36. Disposed in an adjoining region of the observation part 3, 4 facing the ocular 6 is a thumb recess 37. The housing extension 36 forms an internal housing region for the device electronics, in particular for the control and evaluation unit 24. The external shape of the housing extension 36 and thumb recess 37 make for a particularly good ergonomic design and grip design, so that the observation device 1 can be comfortably held in the palms of the hand. Another advantage of this shape is that it results in an improved levering effect in that it makes it easier to pivot the two observation parts 3, 4 of the observation device 1. It is also practical for the eye width adjustment in the case of a linear displacement of the observation parts 3, 4 with respect to one another.

FIG. 9 illustrates an observation device 1 with an alternative embodiment of the eye width adjustment system for the two observation parts 3, 4. To this end, at least one telescopic-type connection is provided between the observation parts 3, 4 which enables a linear displacement of the observation parts 3, 4 with respect to one another in a direction perpendicular to the longitudinal extensions of the two observation parts 3, 4. In order to make it easier to adjust the eye width, a positioning wheel (not illustrated) may also be provided in order to operate a positioning gear determining the eye width.

On the basis of another embodiment of the observation device 1 illustrated in FIG. 9, the observation parts 3 and 4 constitute a modular observation device 1. Accordingly, the first observation part 3 can be separated or uncoupled from the second observation part 4 so that the observation part 3 can be used as an independent magnifier device, in which case the display element 25 is also integrated in it. The first observation part 3 may be fitted on a stand, for example, and can serve as a laser distance meter separately.

Another possible alternative application of the modular observation devices illustrated in FIG. 9 is illustrated in FIG. 10. In this instance, the observation part 3 is illustrated as a sighting telescope of a weapon 38. Having been separated from the second observation part 4 (FIG. 9), the first observation part 3 is fitted on an appropriately designed mounting support 39 and is thus fixedly connected to the weapon 38. The user now has the option of setting up the output on the display element 25 in which the function of the sight mark 28 is also integrated via the software-controlled device electronics to suit his requirements. For example, the user can set the horizontal orientation of the distance display in the visual field and can view and choose a sight mark 28 from a predefined number to carry on using the observation part 3 as a sighting telescope.

In the description given above, reference has always been made to a laser distance meter 2 or a laser transmitter 14 by way of example, by means of which the distance between the observation device 1 and an object 40 can be determined and monitored. A person skilled in the art will know that the invention is not restricted to the use of lasers and that other appropriate irradiation sources may also be used in the observation device 1 or in the described magnifier device.

Furthermore, it is also possible to transmit via remote transmission means 41, in particular via wireless remote transmission means 41, for example by radio or infrared, the measured distance and other data, such as the selected focus setting and/or a magnification factor and/or brightness or temperature values, from different parts of the observation device 1 or separate display and/or evaluation devices. However, it may also be expedient to store these in the observation device 1 or link them to one another and store them for different evaluations, in which case they can be displayed when prompted on a display device 42 mounted on the external face of the observation device 1.

It would also be possible to transmit this data via these transmission means to an external display element, which is advantageously also independent of or disposed separately from the observation device 1. Above all, this data can be expediently transmitted to a sighting telescope of a weapon or other systems for monitoring and controlling devices which require such information pertaining to distance. Another option is to provide the display and/or evaluation devices with remote transmission means 41 or separate cables from the control and evaluation unit 24 as well as the displacement motor 43 for the focusing device 7 and also for a synchronously activated transmitter focusing system 35.

As proposed by the invention, the binocular observation device has two separate joint pins 44, between which a gap 45 is left free, which is laterally bounded by the observation parts 3, 4. Such a binocular observation device 1, in particular a field glass, has two visual optical paths 11, 12 with a distance meter using a measuring beam with a beam transmitter and a beam receiver. A part of an optical path 16, 20 of the beam transmitter or the beam receiver is therefore integrated in at least one optical path 11, 12. The two observation parts 3, 4 are connected to one another via two connecting mechanisms 46, e.g. a hinged bridge or telescopic guide, in the direction of the optical path 11,12, spaced at a distance apart from one another along the observation direction so that they can be moved in terms of their relative position. It is of advantage if the beam transmitter and the beam receiver as well as the optical elements of the optical paths 11, 12, 16, 20 for the measuring beam and reflected measuring beam and/or display elements or sight marks as well as the components of the control and monitoring device 24 and power supply system are disposed outside of the gap bounded by the two observation parts between the two connecting mechanisms and the mutually facing end faces thereof.

The embodiments illustrated as examples represent possible variants of the binocular observation device 1 and magnifier device, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the binocular observation device 1 and magnifier device, they and their constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1, 3, 4, 5; 6; 7; 8; 9 and 10 constitute independent solutions proposed by the invention in their own right. The objectives and associated solutions proposed by the invention may be found in the detailed descriptions of these drawings.

| List of reference numbers | |
| --- | --- |
| 1 | Observation device |
| 2 | Laser distance meter |

-continued

List of reference numbers

| | |
|---|---|
| 3 | First observation part |
| 4 | Second observation part |
| 5 | Lens |
| 6 | Ocular |
| 7 | Focusing device |
| 8 | Reversing system |
| 9 | Roof prism |
| 10 | Deviation prism |
| 11 | First visual optical path |
| 12 | Second visual optical path |
| 13 | Transmitting optical system |
| 14 | Laser transmitter |
| 15 | Transmitting optics |
| 16 | Optical path |
| 17 | Deviation prism |
| 18 | Splitter prism |
| 19 | Face |
| 20 | Optical path |
| 21 | Receiver |
| 22 | Receiving optical system |
| 23 | Receiver prism |
| 24 | Control and evaluation unit |
| 25 | Display element |
| 26 | Displays optics |
| 27 | Optical path |
| 28 | Sight mark |
| 29 | Optical path |
| 30 | Sight mark optics |
| 31 | Beam splitter |
| 32 | Mirror |
| 33 | Gable surface |
| 34 | Face |
| 35 | Transmitter focusing device |
| 36 | Housing extension |
| 37 | Thumb recess |
| 38 | Weapon |
| 39 | Mounting support |
| 40 | Object |
| 41 | Remote transmission means |
| 42 | Display device |
| 43 | Displacement motor |
| 44 | Joint pin |
| 45 | Gap |
| 46 | Connecting element |

The invention claimed is:

1. A long range optical device with at least a first visual optical path and a focusing device for focusing the at least first visual optical path, and with a laser distance meter with a laser transmitter and a laser receiver, wherein a part of an optical path of the laser transmitter or a part of an optical path of the laser receiver extend in the at least first visual optical path to an objective lens, and a region of the deflection of the optical path of the laser transmitter into the at least first visual optical path or a region of the deflection of the optical path of the laser receiver out of the at least first visual optical path are disposed on at least one optical component, and with an optical display element, wherein the focusing device is disposed between the at least one optical component for deflecting the optical path of the laser transmitter and the objective lens or between the at least one optical component for deflecting of the optical path of the laser receiver and the objective lens, wherein in order to integrate the optical path of the laser transmitter and the optical path of the laser receiver in the first visual optical path, at least one second optical component is provided so as to cause the merging of the optical paths of the laser transmitter and laser receiver.

2. The long range optical device, according to claim 1, wherein regions of the merger of the optical paths of the laser transmitter and/or of the laser receiver are disposed on a first optical component of the at least one second optical components.

3. The long range optical device, according to claim 2, wherein the regions of the merger of the optical path of the laser transmitter and/or of the laser receiver are disposed on a single face of the one of the at least one second optical components.

4. The long range optical device, according to claim 1, wherein the region of the merger is disposed between an observer-side focal point of the objective lens and the focusing device or objective lens.

5. A long range optical device with at least a first visual optical path and a focusing device for focusing the at least first visual optical path, and with a laser distance meter with a laser transmitter and a laser receiver, wherein a part of an optical path of the laser transmitter or a part of an optical path of the laser receiver extend in the at least first visual optical path to an objective lens, and a region of the deflection of the optical path of the laser transmitter into the at least first visual optical path or a region of the deflection of the optical path of the laser receiver out of the at least first visual optical path are disposed on at least one optical component, and with an optical display element, wherein the focusing device is disposed between the at least one optical component for deflecting the optical path of the laser transmitter and the objective lens or between the at least one optical component for deflecting of the optical path of the laser receiver and the objective lens, wherein two observation parts each comprising one of the first visual optical path and the second visual optical path are connected via two connecting mechanisms with two separate joint pins spaced apart from one another in the direction of the optical paths so that the observation parts can be displaced in terms of their relative position, wherein between the joint pins a gap is left free which is laterally bounded by the observation parts.

6. The long range optical device, according to claim 5, wherein the joint pins are connected at its two end regions facing the two observation parts via a joint to each of the two observation parts, the pivot axis of which extends approximately parallel with the longitudinal axes of the two observation parts.

7. A long range optical device with at least a first visual optical path and a focusing device for focusing the at least first visual optical path, and with a laser distance meter with a laser transmitter and a laser receiver, wherein a part of an optical path of the laser transmitter or a part of an optical path of the laser receiver extend in the at least first visual optical path to an objective lens, and a region of the deflection of the optical path of the laser transmitter into the at least first visual optical path or a region of the deflection of the optical path of the laser receiver out of the at least first visual optical path are disposed on at least one optical component, and with an optical display element, wherein the focusing device is disposed between the at least one optical component for deflecting the optical path of the laser transmitter and the objective lens or between the at least one optical component for deflecting of the optical path of the laser receiver and the objective lens, wherein two observation parts are connected via two connecting mechanisms spaced apart from one another in the direction of the optical paths so that they can be displaced in terms of their relative position, wherein one or more hinged bridges is provided as the connecting element.

8. A long range optical device with at least a first visual optical path and a focusing device for focusing the at least first visual optical path, and with a laser distance meter with a laser transmitter and a laser receiver, wherein a part of an optical path of the laser transmitter or a part of an optical path of the laser receiver extend in the at least first visual optical path to an objective lens, and a region of the deflection of the optical path of the laser transmitter into the at least first visual optical path or a region of the deflection of the optical path of the laser receiver out of the at least first visual optical path are disposed on at least one optical component, and with an optical display element, wherein the focusing device is disposed between the at least one optical component for deflecting the optical path of the laser transmitter and the objective lens or between the at least one optical component for deflecting of the optical path of the laser receiver and the objective lens, wherein two observation parts are connected via two connecting mechanisms spaced apart from one another in the direction of the optical paths so that they can be displaced in terms of their relative position, wherein a keel-shaped housing extension is disposed on at least one of the two observation parts.

9. The long range optical device, according to claim 8, wherein the housing extension comprises an internal housing region for the device electronics.

10. A long range optical device with at least a first visual optical path and a focusing device for focusing the at least first visual optical path, and with a laser distance meter with a laser transmitter and a laser receiver, wherein a part of an optical path of the laser transmitter or a part of an optical path of the laser receiver extend in the at least first visual optical path to an objective lens, and a region of the deflection of the optical path of the laser transmitter into the at least first visual optical path or a region of the deflection of the optical path of the laser receiver out of the at least first visual optical path are disposed on at least one optical component, and with an optical display element, wherein the focusing device is disposed between the at least one optical component for deflecting the optical path of the laser transmitter and the objective lens or between the at least one optical component for deflecting of the optical path of the laser receiver and the objective lens, wherein two observation parts are connected via two connecting mechanisms spaced apart from one another in the direction of the optical paths so that they can be displaced in terms of their relative position, wherein one of the two observation parts is designed as an independent long range optical device.

11. A long range optical device with at least a first visual optical path and a focusing device for focusing the at least first visual optical path, and with a laser distance meter with a laser transmitter and a laser receiver, wherein a part of an optical path of the laser transmitter or a part of an optical path of the laser receiver extend in the at least first visual optical path to an objective lens, and a region of the deflection of the optical path of the laser transmitter into the at least first visual optical path or a region of the deflection of the optical path of the laser receiver out of the at least first visual optical path are disposed on at least one optical component, and with an optical display element, wherein the focusing device is disposed between the at least one optical component for deflecting the optical path of the laser transmitter and the objective lens or between the at least one optical component for deflecting of the optical path of the laser receiver and the objective lens, wherein the at least one optical component for deflecting the optical path of the laser transmitter and/or of the laser receiver is or are provided as elements of a reversing system.

12. The long range optical device, according to claim 11, wherein the regions of the deflections are disposed on one and the same component provided in the form of a prism.

13. The long range optical device, according to claim 11, wherein the reversing system is provided in the form of a prism system.

14. A long range optical device with at least a first visual optical path and a focusing device for focusing the at least first visual optical path, and with a laser distance meter with a laser transmitter and a laser receiver, wherein a part of an optical path of the laser transmitter or a part of an optical path of the laser receiver extend in the at least first visual optical path to an objective lens, and a region of the deflection of the optical path of the laser transmitter into the at least first visual optical path or a region of the deflection of the optical path of the laser receiver out of the at least first visual optical path are disposed on at least one optical component, and with an optical display element, wherein the focusing device is disposed between the at least one optical component for deflecting the optical path of the laser transmitter and the objective lens or between the at least one optical component for deflecting of the optical path of the laser receiver and the objective lens, wherein the regions of the deflection are disposed on a single component.

* * * * *